United States Patent Office 3,287,342
Patented Nov. 22, 1966

3,287,342
PROCESS FOR VISBREAKING POLYOLEFINS
Roger J. Walton, Bartlesville, Okla., assignor to Phillips Petroleum Company, a corporation of Delaware
No Drawing. Filed May 9, 1963, Ser. No. 279,342
11 Claims. (Cl. 260—93.7)

This invention relates to the visbreaking of polyolefins. In another aspect, it relates to an improved process for visbreaking solid polymers of mono-1-olefins, such as polypropylene.

High moleculer weight thermoplastic polymers can be converted into lower molecular weight polymers having higher melt indexes, improved clarity, and other desirable properties by a thermal and mechanical shearing treatment known in the art as "visbreaking." Visbroken polymers, as compared with the non-visbroken material, have improved processability and relatively high flow at comparatively low pressure, thus permitting the production of extruded products having a good knitting of weld lines and improved surface gloss. Visbroken polymers are suitable for use in injection molding applications where they supply a combination of good processability, toughness and excellent service. Visbroken polymers are also useful for pipe and wire applications due to their improved processability and excellent flow at low pressure which permits the production of extruded product having an extremely smooth and glossy surface. Tubular film made from visbroken polymers is superior to film made from the non-visbroken polymer in stress-strain properties and tear strength and has improved sparkle and clarity. Visbroken polymers are also suitable for use in paper coating applications, the coated paper having less of the undesirable "nerve" than that of paper coated with the non-visbroken material. Cast polymer film or that produced by the chill roll method from visbroken polymers, such as polypropylene, has better clarity (less haze) than that made from the non-visbroken polymer.

Accordingly, an object of this invention is to improve the visbreaking treatment of polyolefins. Another object is to provide an improved process for visbreaking polymers of mono-1-olefins, such as polypropylene. These and other objects will become apparent to those skilled in the art from the following description and appended claims.

Briefly, I have discovered that the visbreaking treatment of normally solid polymers of mono-1-olefins can be improved by subjecting the polymers to visbreaking conditions in the presence of an additive comprising a metal coordinate compound of a beta-diketone added to and admixed with the polymer. Such metal coordinate compounds accelerate the visbreaking of the polymer in that a quicker reduction in molecular weight distribution of the polymer occurs and the resulting visbroken polymer has a greater clarity (or less haze) than the non-visbroken polymer.

The novel additives which are used according to this invention to accelerate the visbreaking treatment of solid polymers of mono-1-olefins are the coordinate compounds of the metals of Groups I to Group VIII, inclusive, of the Periodic Table (as shown on pages 56–57 on the eighth edition of Lange's Handbook of Chemistry) with beta-diketones having the general formula:

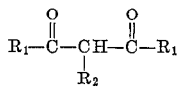
(1)

where:

$R_1$ is a hydrocarbon radical such as alkyl, cycloalkyl, aryl, and combinations thereof, such as alkaryl, alkylcycloalkyl, cycloalkylalkyl, aralkyl, and the like, with $R_1$ preferably having 1 to 8 carbon atoms, and where $R_2$ is hydrogen or a hydrocarbon radical like $R_1$.

A preferred subclass of said metal coordinate compounds are those in which the metals are selected from the group consisting of those of Groups IB, IIB, IIIA, IVA, IVB, VB, VIB, VIIB, and the first period of Group VIII, such as copper, zinc, cadmium, mercury, titanium, zirconium, vanadium, chromium, manganese, aluminum, tin, lead, iron, cobale, nickel, and the like, including mixtures thereof.

The metal coordinate compounds and their preparations are known in the art and they can be represented by the general formula:

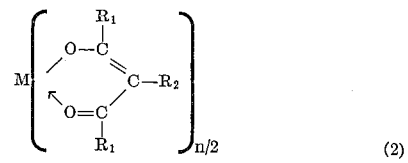
(2)

where:

M is a cation of a metal as defined above, $n$ is the coordination number of M, and $R_1$ and $R_2$ are as defined above for Formula 1.

Representative metal coordinate compounds useful in the practice of this invention include tris(2,4-pentanediono)aluminum,
tris(2,4-pentanediono)titanium,
bis(2,4-pentanediono)iron,
tris(2,4-pentanediono)iron,
tris(3-methyl-2,4-pentanediono)titanium,
tris(2,4-heptanediono)aluminum,
tris(2-methyl-4-ethyl-3,5-heptanediono)iron,
tris(5-methyl-2,4-hexanediono)titanium,
bis(2,4-octanediono)iron,
tris(5,5-dimethyl-2,4-hexanediono)iron,
tris(3-ethyl-2,4-pentanediono)aluminum,
tris(2,2-dimethyl-3,5-nonanediono)titanium,
bis(7-isopropyl-6,8-tetradecanediono)iron,
tris(3-methyl-4-ethyl-7-octyl-11-isopropyl-6,8-tri-
   decanedion)titanium,
tris(10-octyl-9,11-nonadecanedion)aluminum,
tris(8,10-heptadecanediono)titanium,
tris(8-ethyl-7,9-dodecanediono)iron,
tris(6-octyl-5,7-undecanediono)aluminum,
bis(1-phenyl-1,3-pentanediono)iron,
tris(1-phenyl-2-methyl-1,3-octanediono)iron,
tris(1-phenyl-2,4-pentanediono)aluminum,
bis(1-[4-methylphenyl]-1,3-butanediono)iron,
tris(1,2,3-triphenyl-1,3-propanediono)titanium,
bis(1-phenyl-5,5-dimethyl-2,4-hexanediono)iron,
tris(1-phenyl-2-benzyl-1,3-butanediono)aluminum,
tris(1,3-diphenyl-1,3-propanediono)aluminum,
tris(1,4-diphenyl-1,3-butanediono)iron,
tris(4-phenyl-3,5-heptanediono)titanium,
bis(1-cyclohexyl-1,3-butanediono)iron,
tris(1,3-dicyclopentyl-2-octyl-1,3-propanediono)iron,
tris(1,2-dicyclopentyl-3-cyclohexyl-1,3-propanediono)
   aluminum,
bis(1-phenyl-2-pentyl-3-cyclohexyl-1,3-propanediono)
   titanium,
tris(1-phenyl-3-methyl-2,4-nonanediono)iron,
tris(10-[2-methylcyclopentyl]-11-[4-methylphenyl]-
   9,11-henadecanediono)aluminum,
tris(1-phenyl-4-[2-phenylmethyl]-7-cyclohexyl-
   3,5-heptanediono)aluminum, tris(1-[2-methyl-4-ethylcyclopentyl]-2-cyclopentyl-3-
[2,4-dimethylcyclophenyl]-1,3-propanediono)
aluminum, and the like (including mixtures thereof, as well as the corresponding coordinate compounds of copper, zinc, cadmium, mercury, zirconium, vanadium, chromium, manganese, tin, lead, cobalt, and nickel. The metal coordinate compounds which I prefer to use are those of acetylacetone, and these are commonly referred to as acetylacetonates, e.g., aluminum acetylacetonate, titanium acetylacetonate, ferrous acetylacetonate, and ferric acetylacetonate.

The aforementioned metal coordinate compounds function as very active catalysts in the visbreaking treatment of this invention and only small amounts are necessary to bring about the desired improvement. Though the amount of the metal coordinate compound to be used will depend upon the particular polymer being visbroken, the visbreaking conditions, and the particular metal coordinate compound used, generally the amount of metal coordinate compound used will be from 10 to 3,000 parts per million parts of polymer, preferably 100 to 1,000 p.p.m. The meaal coordinate compounds can be added to and brought in contact with the polymer to be visbroken by any suitable means. For example, the metal coordinate compounds can be simply admixed with the polymer in particulate form, or can be incorporated into the polymer by milling or kneading procedures in a Banbury mixer or on a roll mill. Alternatively, the metal coordinate compounds can be dissolved in a volatile solvent, such as water, acetone, ethyl ether, ethyl alcohol, and the like and sprayed onto the particulate polymer to be visbroken, for example, while the polymer is being conveyed in a screw conveyor or while it is tumbling in a drum, after which the solvent can be removed by a current of air and/or heating. In short, any suitable technique for admixing the polymer with the metal coordinate compounds can be used.

The admixture of the metal coordinate compound and polymer is then visbroken using any suitable conventional visbreaking technique. For example, the additive-polymer mixture can be subjected to the thermal and mechanical shearing treatment effected by a heated-screw extruder such as a Davis-Standard 1.5-inch diameter screw, electrically-heated, devolatilizing extruder. Or, as another example, the additive-polymer admixture can be visbroken in an Egan extruder such as described in U.S. Patent 2,785,348. Other visbreaking appartus which can be used in this invention will become apparent to those skilled in the art. During the visbreaking treatment, the polymer melts in the presence of the metal coordinate compounds, the presence of such compounds accelerating the breakdown of the high molecular weight polymer to lower molecular weight polymer. Following the visbreaking treatment, the molten polymer can be extruded through a die in a form of a strand, film, etc., and the extruded polymer solidified by cooling, for example, in a water bath or by contact with a chilled roll. The thus-visbroken polymer can be fabricated as desired and used in the applications mentioned hereinbefore. Although the visbreaking conditions which can be used in this invention will be apparent to those skilled in the art, I prefer to carry out the visbreaking at temperatures in the range of 375 to 900° F. and pressures in the range of 1 to 1,000 p.s.i.g. for periods of time on the order of 0.1 to 10 minutes.

The polymers which can be visbroke according to the improved process of this invention include any of those normally solid polymers prepared from mono-1-olefin. The olefins which can be used preferably include at least one olefin selected from those having a maximum of 8 carbon atoms per molecule such as ethylene, propylene, 1-butene, 1-pentene, 3-methyl-1-butene, and the like, and the term "polymer" as used herein includes homopolymers and copolymers of such olefins, such as ethylene-propylene copolymer and ethylene-butene copolymer. This invention is particularly useful in the visbreaking of the highly crystalline, isotactic polymers prepared by polymerizing mono-1-olefins containing 2 to 5 carbon atoms per molecule. Blends of olefin polymers can also be treated according to this invention, such as blends of high melt index polymer and low melt index polymer. For example, the high melt index polymer of such a blend can be a solution type polymer of a 1-olefin having a density of 0.940 to 0.990 gram per cc., a molecular weight above 25,000 and a melt index of less than 20, preferably 1.0 to 12, and the low melt index polymer of such a blend can be a particle form polymer of ethylene, or mixtures of ethylene with other 1-olefins, which is compatible with the high melt index polymer. (The melt index referred to herein can be determined according to the method ASTM D1238–52T.)

A wide variety of catalyst systems are known in the prior art for polymerizing mono-1-olefins to form high molecular weight, normally solid polymers, and any of such catalyst systems can be used to prepare the polymers which are visbroken according to this invention. As an example, the polymerization catalyst can be one which comprises, as an essential ingredient, chromium oxide, preferably including a substantial amount of hexavalent chromia, which can be associated with silica, alumina, zirconia, and thoria, as disclosed in U.S. Patent No. 2,825,721 of Hogan et al. An especially useful catalyst for the polymerization of propylene to form polypropylene is that which is obtained upon commingly a dialkylaluminum chloride, such as diethylaluminum chloride, and the reaction product obtained by reacting aluminum and titanium tetrachloride, for example at temperatures of 260 to 600° F., said reaction product being represented by the formula which is approximately $AlTi_3Cl_{12}$ (or $3TiCl_3 \cdot AlCl_3$). The polymerization of propylene with such catalysts can be carried out in the presence of elemental hydrogen, e.g., from 0.15 to 0.40 mol percent hydrogen in the liquid mono-1-olefin phase.

The following examples further illustrate the objects and advantages of this invention, but these examples should not be construed so as to unduly limit the invention.

*Example 1*

Polypropylene was visbroken in a series of runs in the presence of various metal coordinate compounds of acetylacetone according to the practice of this invention.

The polypropylene used was obtained by polymerizing liquid propylene containing 0.15 mol percent hydrogen in a loop reactor at 400 p.s.i.a. and 115° F. in the presence of a catalyst comprising 0.11 lb./hr. of the reaction product of aluminum and titanium tetrachloride and 0.009 lb./hr. of diethylaluminum chloride. Charge and withdrawal rates were 10 gal./min. The polymerization effluent content 73 vol. percent solid polypropylene, and the recovered polymer was treated with acetylacetone and propylene oxide, washed with liquid propylene, admixed with an anti-oxidant consisting a solution of n-pentane containing 0.1 wt. percent of Ionol (2,6-di-tert-butyl-4-methylphenol) and 0.1 wt. percent of dilaurylthiodipropionate, after which the polymer was dried at 250° F.

Particulate polypropylene prepared as described above was dry mixed with 200 p.p.m. of several different metal acetylacetonates (coordinate compounds of metals with acetylacetone). Each additive-polymer mixture was fluxed in a nitrogen atmosphere for 10 min. during which the temperature was increased to 383° F., and mixed in air at that temperature in a C. W. Brabender Plastograph mixer. In each run, the drop in torque (meter-grams) required to turn the rotors of the mixer in a 10-min. mixing period was noted, the drop in torque being an indication of the breakdown of the polymer. The greater the drop in torque, the greater the acceleration of the visbreaking treatment. Table I summarizes these runs and the results obtained, including that run in which the polymer was visbroken in the absence of a metal acetylacetonate.

TABLE I

| Run | Metal coordinate compound used | Drop in torque, m.-g. |
| --- | --- | --- |
| 1 | None | 100 |
| 2 | Aluminum acetylacetonate | 400 |
| 3 | Titanium acetylacetonate | 300 |
| 4 | Ferric acetylacetonate | >500 |
| 5 | Ferrous acetylacetonate | >500 |

The data of Table I show that the visbreaking treatment is significantly accelerated when it is carried out in the presence of a metal coordinate compound of a beta-diketone, according to this invention.

*Example II*

Polypropylene of the same time used in Example I was admixed with 100 p.p.m. of aluminum acetylacetonate (sprayed on the polymer as a solution in a 50/50 mixture of acetone and methanol). The additive-polymer mixture was then visbroken and extruded in the Davis Standard extruder mentioned earlier in the form of a chill-roll film at a final temperature of 550° F., a final pressure of 1,000 p.s.i.g., and with a residence time in the extruder of 5 min. (during which it was heated from room temperature to the said final temperature). A control run was made in which the polymer per se was visbroken for comparison purposes. The clarity of the chill-roll film of these two runs, in terms of percent haze, according to the method of ASTM D1003–61, was then measured. Results of these runs are summarized in Table II.

TABLE II

| Run | Metal coordinate compound used | Haze, percent |
| --- | --- | --- |
| 1 | None | 6.2 |
| 2 | Aluminum acetylacetonate | 0.9 |

The data of Table II show a significant decrease in haze of the visbroken polymer film can be obtained when the visbreaking is carried out in the presence of a metal coordinate compound of a beta-diketone, according to this invention.

*Example III*

The polypropylene used in Example I, having a melt index of 1.0 (as determined by ASTM D1238–57T, 230° C., using 2,160 gms.), is mixed with 200 p.p.m. of aluminum acetylacetonate, and the resulting mixture is visbroken in a high speed, heated-screw extruder at a final temperature of 600° F. and a final pressure of 700 p.s.i.g., for 0.3 min. The melt index of the resulting visbroken polymer is 13.0, as compared with a melt index of 5.0 for the same polypropylene visbroken under the same conditions in the absence of a metal acetylacetonate.

Various modifications and alterations of this invention will become apparent to those skilled in the art from the foregoing description and examples without departing from the scope and spirit of this invention, and it should be understood that this invention is not to be limited unduly to that set forth herein for illustrative purposes.

I claim:

1. A process which comprises visbreaking at a temperature in the range of 375° to 900° F. a polyolefin in the presence of an additive having the general structure:

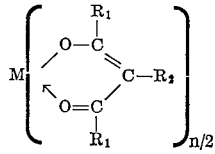

where M is a cation of a metal selected from the group consisting of the metals of Groups IB, IIB, IIIA, IVA, IVB, VB, VIB, VIIB, and the first period of Group VIII, $n$ is the coordination number of said metal, $R_1$ is a radical selected from the group consisting of alkyl, aryl, cycloalkyl and combinations thereof, and $R_2$ is selected from the group consisting of hydrogen and said $R_1$ radicals, added to and admixed with said polyolefin.

2. In a process wherein a normally solid polymer of a mono-1-olefin is subjected to visbreaking, the improvement comprising carrying out said visbreaking at a temperature in the range of 375° to 900° F. in the presence of an additive added to and admixed with said polymer in an amount sufficient to accelerate said visbreaking, said additive having the general structure:

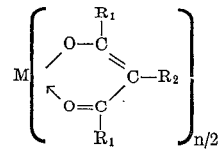

where M is a cation of a metal selected from the group consisting of the metals of Groups IB, IIB, IIIA, IVA, IVB, VB, VIB, VIIB, and the first period of Group VIII, $n$ is the coordination number of said metal, $R_1$ is a radical selected from the group consisting of alkyl, aryl, cycloalkyl, and combinations thereof, and $R_2$ is selected from the group consisting of hydrogen and said $R_1$ radicals.

3. The process according to claim 2, wherein said olefin has 2 to 8 carbon atoms per molecule and no branching nearer the double bond than the 4-position.

4. The process according to claim 2, wherein said olefin is ethylene.

5. The process according to claim 2, wherein said olefin is propylene.

6. The process according to claim 2, wherein the amount of additive used is 10 to 3,000 parts per million parts of said polymer.

7. In a process wherein polypropylene is subjected to visbreaking, the improvement comprising carrying out said visbreaking at a temperature in the range of 375° to 900° F. in the presence of aluminum acetylacetonate added to and admixed with said polymer in an amount sufficient to accelerate said visbreaking.

8. In a process wherein polypropylene is subjected to visbreaking, the improvement comprising carrying out said visbreaking at a temperature in the range of 375° to 900° F. in the presence of titanium acetylacetonate added to and admixed with said polymer in an amount sufficient to accelerate said visbreaking.

9. In a process wherein polypropylene is subjected to visbreaking, the improvement comprising carrying out said visbreaking at a temperature in the range of 375° to 900° F. in the presence of ferric acetylacetonate added to and mixed with said polymer in an amount sufficient to accelerate said visbreaking.

10. In a process wherein polypropylene is subjected to visbreaking, the improvement comprising carrying out said visbreaking at a temperature in the range of 375° to 900° F. in the presence of ferrous acetylacetonate added to and mixed with said polymer in an amount sufficient to accelerate said visbreaking.

11. A composition comprising in admixture a polyolefin and an additive having the general structure:

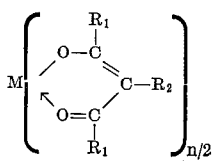

where M is a cation of a metal selected from the group consisting of the metals of Groups IB, IIB, IIIA, IVA, IVB, VB, VIB, VIIB, and the first period of Group VIII, $n$ is the coordination number of said metal, $R_1$ is a radical selected from the group consisting of alkyl, aryl, cycloalkyl and combinations thereof, and $R_2$ is selected from the group consisting of hydrogen and said $R_1$ radicals, wherein said additive is present in the concentration of 100 to 1000 p.p.m.

References Cited by the Examiner

UNITED STATES PATENTS 3,037,012 5/1962 Lehnerer et al. _____ 260—94.9
3,098,845 7/1963 Cull et al. _____ 260—93.7

JOSEPH L. SCHOFER, *Primary Examiner.*

L. EDELMAN, *Assistant Examiner.*